(12) United States Patent
Keyser et al.

(10) Patent No.: US 8,475,664 B2
(45) Date of Patent: Jul. 2, 2013

(54) CONTROL METHOD FOR HYDROCARBON HYDROCYCLONES

(75) Inventors: Paul Martin Keyser, Sandy, UT (US);
Timothy John Olson, Salt Lake City, UT (US)

(73) Assignee: FLSmidth A/S (DK)

( * ) Notice: Subject to any disclaimer, the term of this patent is extended or adjusted under 35 U.S.C. 154(b) by 603 days.

(21) Appl. No.: 12/701,879

(22) Filed: Feb. 8, 2010

(65) Prior Publication Data

US 2011/0192802 A1   Aug. 11, 2011

(51) Int. Cl.
*B01D 21/30*   (2006.01)

(52) U.S. Cl.
USPC ........... 210/741; 210/788; 210/801; 210/802; 210/803; 210/97; 210/137; 210/512.1; 210/532.1; 210/538; 210/540

(58) Field of Classification Search
USPC ........................... 210/788, 801, 802, 803, 741
See application file for complete search history.

(56) References Cited

U.S. PATENT DOCUMENTS

| | | | |
|---|---|---|---|
| 5,996,690 A | 12/1999 | Shaw et al. | |
| 6,355,178 B1* | 3/2002 | Couture et al. | 210/748.05 |
| 7,241,393 B2* | 7/2007 | Stoy et al. | 210/788 |
| 2004/0055972 A1 | 3/2004 | Garner et al. | |
| 2007/0187321 A1* | 8/2007 | Bjornson et al. | 210/512.3 |

OTHER PUBLICATIONS

Hydrocylcones (no author credited), internet articlel http://merpro.com/section.php?page=hydrocyclones; printed Apr. 7, 2009.
Deoiling Hydrocyclones (no author credited), internet article; http://processgroup.com.au/Default.aspx?tabid=87; printed Apr. 7, 2009.

* cited by examiner

*Primary Examiner* — Duane Smith
*Assistant Examiner* — Paul J Durand
(74) *Attorney, Agent, or Firm* — Aaron M. Pile

(57) ABSTRACT

The overflow and underflow effluents of a conventional hydrocyclone are discharged into enclosed vessels, so that the operating pressure may be manipulated for each effluent independently of other operating parameters. Each of the effluent vessels is equipped with a source of pressurized gas to form a gas blanket over the effluent at a controllable pressure. Such variable pressures in each vessel, in combination with the pressure of the incoming feed stream, provide the necessary parameters to implement pressure-differential-ratio control, thereby improving the efficiency of separation.

20 Claims, 3 Drawing Sheets

CONTROL METHOD FOR HYDROCARBON HYDROCYCLONES

BACKGROUND OF THE INVENTION

1. Field of the Invention

This invention is related in general to the field of liquid/solid separation. In particular, it relates to the use of hydrocyclones for separating bitumen froth from water and solids in the processing of tar sands.

2. Description of the Related Art

Hydrocyclones are used in nearly every water-based liquid/liquid and liquid/solid separation process, and in many particle classification circuits built in the world today, because of their high-volume capacity and simplicity of construction and operation. The feed stream is injected tangentially into the upper section of the hydrocyclone (called the head) to induce its rotation along the interior wall of the hydrocyclone and to produce centrifugal forces in the descending stream. These centrifugal forces decrease the time required to separate faster-settling, heavier liquids and/or coarser particles (as applicable), which migrate to the wall of the hydrocyclone, from slower-settling, lighter liquids and/or finer particles, which are transported to the center of the hydrocyclone by virtue of the drag forces created within the liquid. As a result, the lighter phases are collected overhead in the overflow effluent and the heavier phases at the apex of the hydrocyclone in the underflow effluent.

In liquid/liquid separation, such as in de-oiling processes for the recovery of liquid hydrocarbons from oily water streams, the performance of hydrocyclones is typically controlled by the so-called pressure differential ratio (PDR), defined as the ratio of the pressure differential in the overflow stream to that in the underflow. Referring schematically to the typical hydrocyclone arrangement of FIG. 1, $PDR=(P_F-P_O)/(P_F-P_U)$, where $P_F$ is the pressure of the feed stream F at the inlet of the hydrocyclone, $P_O$ is the pressure at the outlet of the overflow effluent O and $P_U$ is the pressure at the outlet of the underflow effluent U. By controlling the PDR of the process and maintaining it at the optimal level for the particular operation, the efficiency of separation is maximized and controlled. In essence, as operating conditions such as feed flow rate and pressure change over time, the PDR of the process is maintained at the level necessary to produce the desired liquid/liquid split between overflow and underflow of both light and heavy liquids. The control is achieved by adjusting the pressures of the overflow and underflow effluents to the levels necessary to maintain the target pressure differential ratio.

PDR has never been used in liquid/solid separation processes, probably because the underflow consists primarily of solids discharged at atmospheric pressure, typically in open vessels. Therefore, the idea of using pressure at the apex of the hydrocyclone as a control parameter is counterintuitive. However, the adaptation of PDR control to liquid/solid separation processes would be very desirable in the mineral processing industries, especially in the recovery of hydrocarbons from tar sands and in the fine classification of mineral particles.

The process of extracting hydrocarbons from tar sands produces a water slurry of bitumen and sand from which the bitumen is recovered. Typically, the mined tar sands are treated with large amounts of hot water (about 175° F.) to dislodge the bitumen from the sand granules, thereby producing a water slurry of sand that also contains a bitumen froth. Sometime the slurry is diluted with a light liquid hydrocarbon to dissolve the bitumen and reduce the overall viscosity of the hydrocarbon phase. The bitumen in the slurry needs to be separated from the undesirable water and solids for further processing into a synthetic crude oil and hydrocyclones have been used successfully in such separation process. However, because the density difference between the hydrocarbon and water phases is much smaller than that between the water and solids, the efficiency of hydrocarbon recovery with conventional hydrocyclones is less than optimal.

Therefore, the present invention is directed at applying the principle of PDR control to liquid/solid separation processes, in particular as applicable to the recovery of bitumen from tar sands and similar processes, in order to improve the efficiency of the process.

BRIEF SUMMARY OF THE INVENTION

The invention lies in the idea of providing a hermetic environment wherein the overflow and underflow effluents of a conventional hydrocyclone are discharged, so that the operating pressure of each effluent may be manipulated independently of other operating parameters. To that end, the liquid overflow discharge of the hydrocyclone is collected in an enclosed vessel wherein the liquid is accumulated and released independently of the overflow discharge flow rate. The hydrocyclone's mostly solid underflow is similarly collected in a separate enclosed vessel and released independently of the discharge rate from the apex of the hydrocyclone. Both vessels are substantially hermetic so as to maintain a desired pressure level above the effluent collected therein.

According to the invention, each of the effluent vessels is equipped with a source of pressurized gas to form a gas blanket over the respective effluent at a controllable pressure. Such variable pressures in each vessel, in combination with the pressure of the incoming feed stream, provide the necessary parameters to implement pressure-differential-ratio control. Thus, in its simplest implementation, the invention comprises an enclosed vessel connected to the apex of the hydrocyclone and another enclosed vessel connected to the overflow port in the head of the hydrocyclone. Both vessels are equipped with a source of pressurized gas for injection into each vessel to create a gas blanket maintained at the pressure necessary for optimal PDR operation. Conventional pressure sensors for the feed, overflow and underflow effluents and feedback controllers are used to maintain the PDR at a particular set-point.

In an industrial setting, where hydrocyclones are employed in batteries containing dozens of units operating in parallel, the enclosed pressure vessels of the invention are preferably connected to all units so as to maintain the same PDR in the operation of all hydrocyclones. Such an arrangement also greatly simplifies the physical configuration of the resulting apparatus, including the pressure detection, gas delivery and pressure control requirements.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

Figure 1:
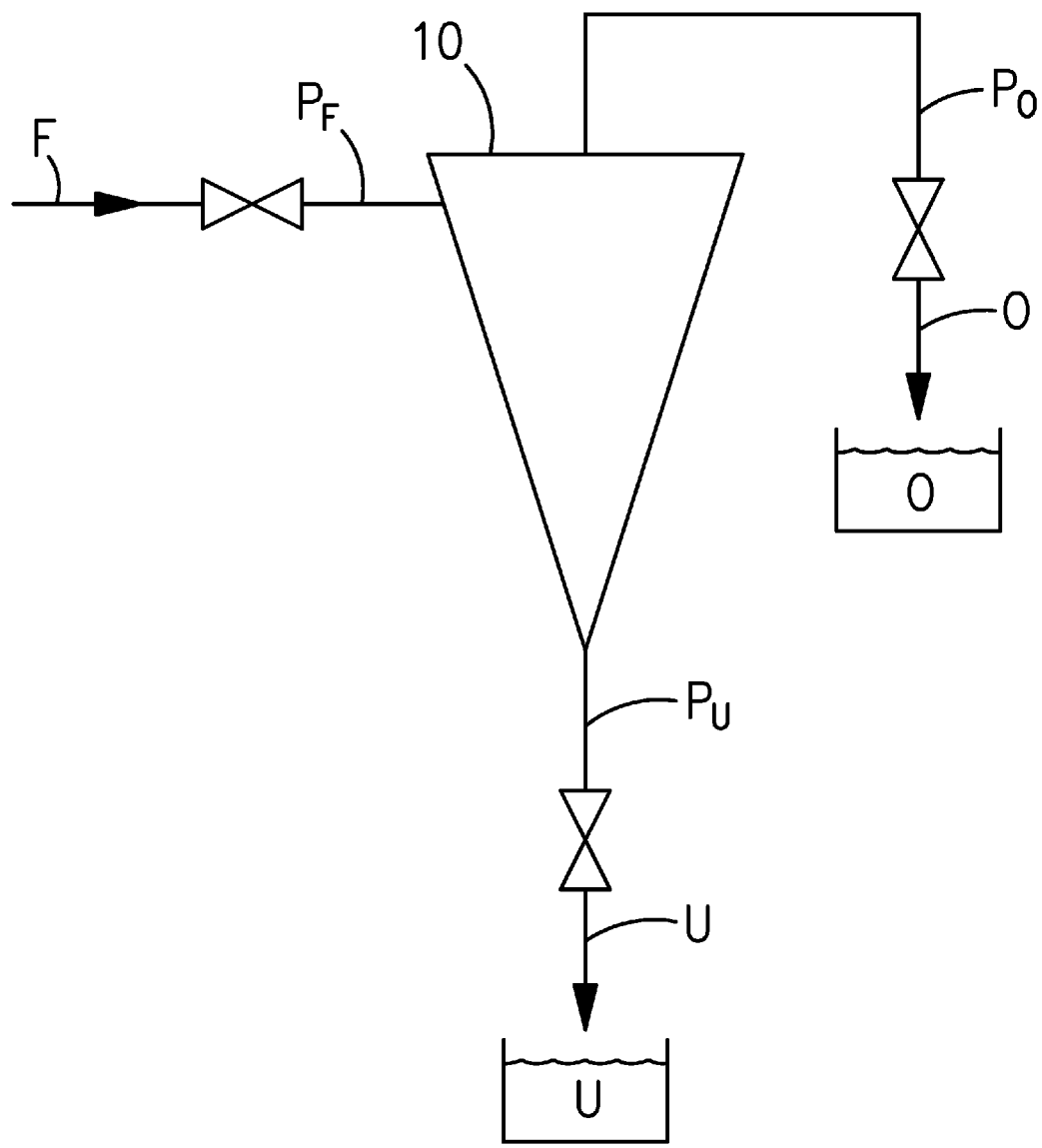
FIG. 1 is a schematic representation of a conventional hydrocyclone.
Figure 2:
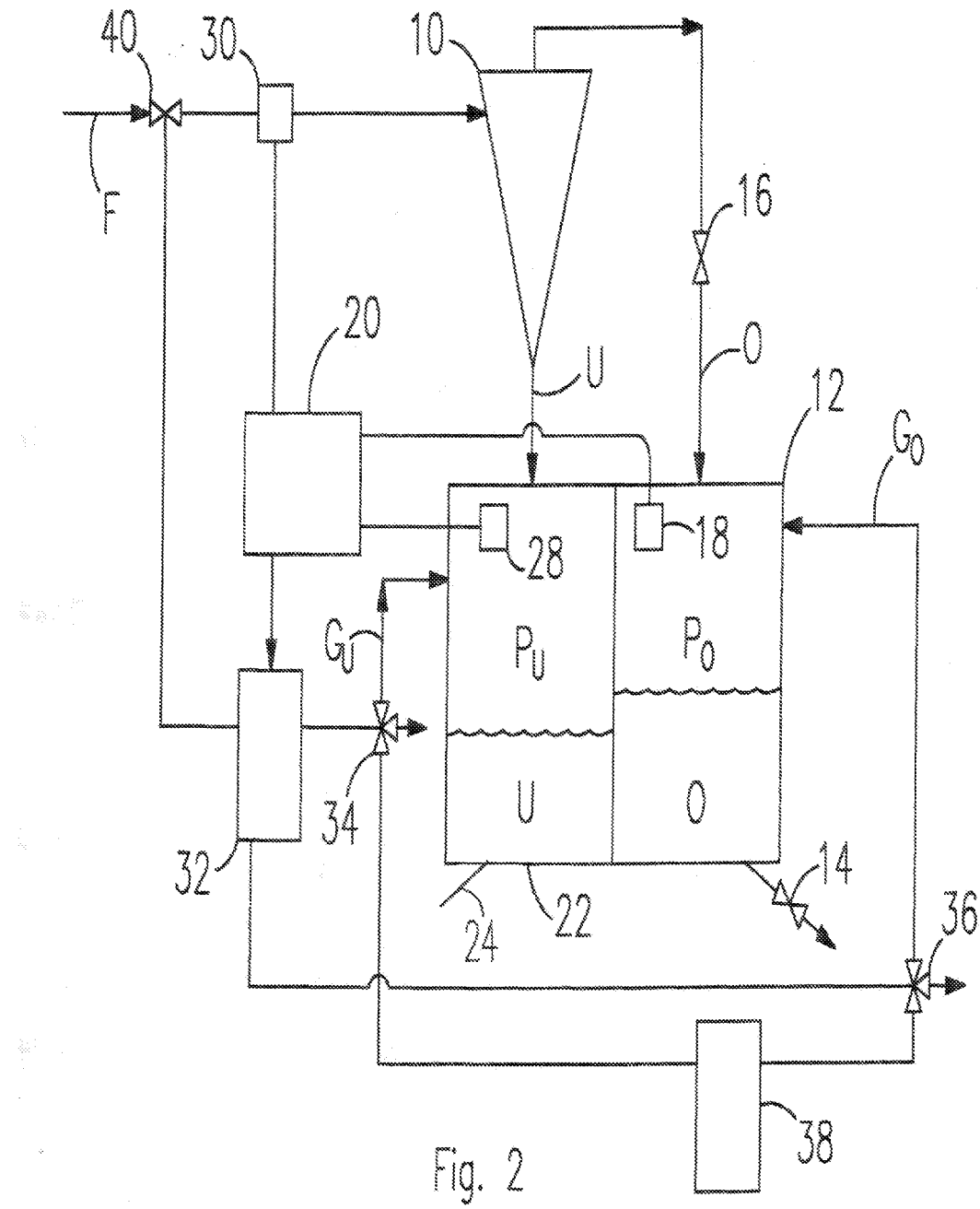
FIG. 2 is a schematic representation of a hydrocyclone modified according to the invention with the additional apparatus required for PDR control.

The invention is preferably implemented by fitting conventional hydrocyclones with the pressure vessels, gas injection, and control apparatus required to effect pressure-differential-ratio control. Referring to the schematic representation of FIG. 2, such a conventional hydrocyclone 10 is modified by discharging the liquid overflow effluent O into an enclosed vessel 12 where the liquid is accumulated prior to being released downstream. A standard flow-control valve 14 is used to set its output flow. The flow of overflow effluent O from the hydrocyclone 10 into the vessel 12 is similarly controlled with a valve 16 that establishes the overflow effluent flow rate. As such, the valve 16 produces a pressure drop that affects the upstream pressure. However, the downstream pressure, the $P_O$ parameter required for PDR control, is not affected by the opening or closing of the valve 16. Therefore, a gas $G_O$ is injected into the vessel 12 to form a blanket of gas above the level of overflow liquid O accumulated in the vessel. The pressure $P_O$ of the gas blanket in the vessel 12 is monitored with a sensor 18 and transmitted to a processor 20.

The hydrocyclone 10 is further modified by discharging the solid underflow effluent O (typically a relatively heavy water slurry) into another enclosed vessel 22 where the mostly solid effluent is accumulated prior to being released downstream through a screw conveyor or similar slurry transport medium 24. The rate of underflow U from the hydrocyclone into the vessel 22 is dependent on the apex aperture and the overall operating conditions of the unit. However, the apex also does not affect the downstream pressure. Therefore, the underflow pressure $P_U$ required for PDR control is also provided by injecting a gas $G_U$ into the vessel 22 to form a blanket of gas above the level of underflow slurry U accumulated in the vessel. The pressure $P_U$ of the gas blanket is monitored with a sensor 28 that is also transmitted to the processor 20.

In order to implement PDR control according to the invention, the pressure $P_F$ of the feed stream is also monitored with a pressure sensor 30 and transmitted to the processor 20. The processor 20 is programmed to calculate a value for the current pressure differential ratio of the hydrocyclone based on the pressure information received for $P_F$, $P_O$ and $P_U$ from the sensors 30, 18 and 28, respectively. The current PDR value is communicated to a control module or controller 32 which, if the PDR is not within a predetermined range of the set-point of the controller, adjusts the pressures $P_O$ and/or $P_U$ in the respective vessels by injecting or releasing gas in either or both vessels 12,22 as necessary to re-establish the target PDR for the operation. This may be achieved, for example, by controlling the flow of gas into the vessels 12,22 through suitable three-way valves 34,36 from a common source of gas, such as a pressurized tank 38 (or alternatively separate tanks connected to the vessels). According to the invention, the valves 34,36 may be controlled to feed gas into the respective tanks or to release gas therefrom, as necessary to maintain the desired pressures. Depending on the particular mineral and liquid/solid mixture of being processed, the controller 32 may also act on the valve 40 controlling the input flow rate to the hydrocyclone in order to change the pressure $P_F$, if advantageous to effectively control the pressure differential ratio of the process. Clearly, the processor 20 and the controller 32 can, and preferably are, implemented with a single microprocessing unit.

As one skilled in the art would recognize, the particular parameters and adjustments required to most effectively control the PDR of a system depend on the nature of the constituents and the operating conditions dictated by the remainder of the processing cycle for the particular operation. Similarly, the gases used to form the blankets of gas in vessels 12 and 22 may be simply air or inert gases, depending on the materials collected in the vessels. For example, an inert gas or natural gas may be required when treating flammable materials, such as the bitumen extracted in the processing of tar sands. The delivery of gas to the vessels may be of any kind and from different sources, as best suited for the particular application and according to availability.

Figure 3:
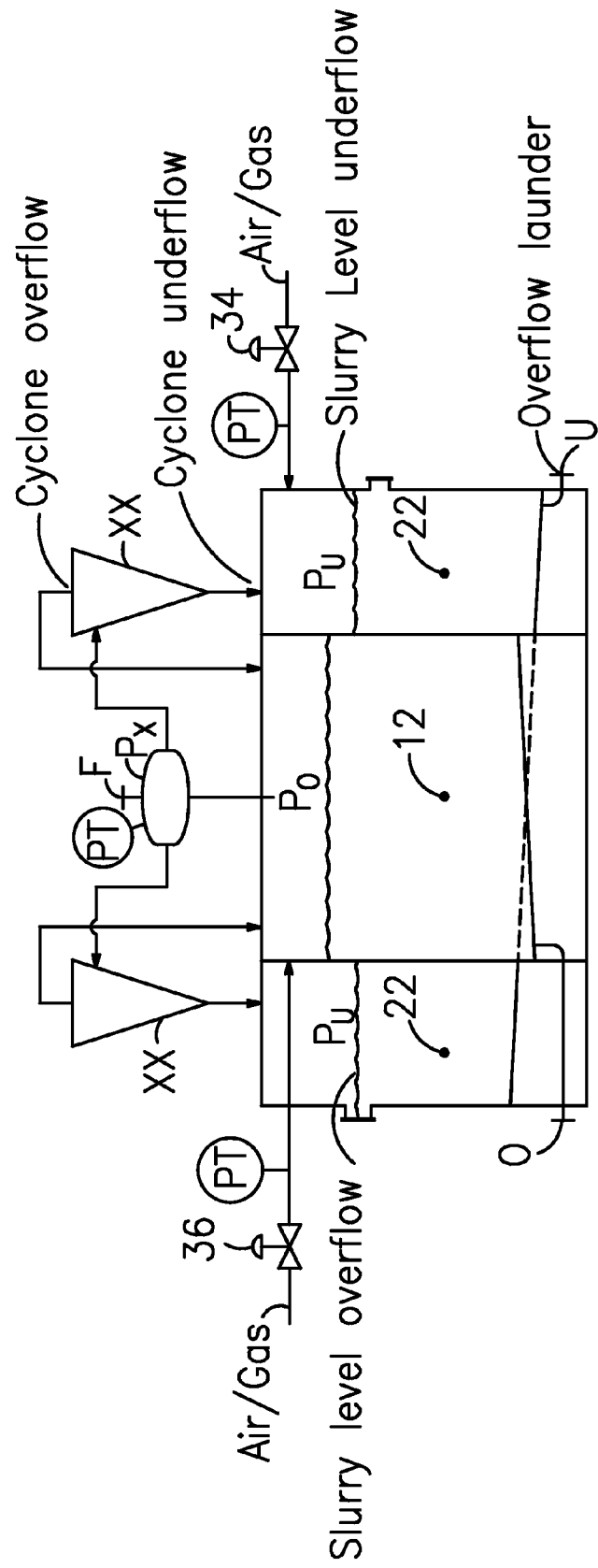
FIG. 3 is a schematic illustration of the invention applied to a battery of hydrocyclones operating in parallel.

In practice, hydrocyclones are operated in parallel in multi-unit batteries wherein only a portion of the units is in operation at any given time and active units are exchanged as needed for maintenance without interruption to the process stream. One such arrangement is illustrated in FIG. 3. In such multi-unit operation, the invention is preferably implemented by utilizing a common enclosed vessel 12 for the overflow output from all hydrocyclones in the battery and also with a common enclosed vessel 22 for the underflow output from the entire battery. A gas injection unit connected to each vessel is used to provide the pressurized blankets of gases $G_O$ and $G_U$ required to maintain the target PDR.

The invention was tested in a proof-of-concept laboratory experiment wherein the overflow and underflow outputs of a hydrocyclone were connected to enclosed volumes pressurized with air. The material used was a slurry of coal particles classified to remove fines. The test showed that the recovery of fines in the overflow was advantageously affected by changing the PDR of the system by controlling the pressures in the output vessels. In essence, the desired separation between finer and coarser coal particles could be achieved by changing the PDR of the operation. Inasmuch as the same principles apply to liquid/solid separation, the invention is expected to provide a significant operational advantage in the treatment of tar sands and other slurry systems.

Various changes in the details, steps and components that have been described may be made by those skilled in the art within the principles and scope of the invention herein illustrated and defined in the appended claims. For example, while the invention has been developed and described herein primarily in relation to improving the recovery of bitumen from tar sands, it is expected that it will prove to be very useful as well in other liquid/solid separation operations, including solid fines classification (such as in coal processing), as demonstrated by the laboratory test conducted to prove the concept of the invention. Therefore, the invention is not to be limited to the details disclosed herein but is to be accorded the full scope of the claims so as to embrace any and all equivalent processes and products.

We claim:
1. A liquid/solid separation unit comprising:
a hydrocyclone;
an enclosed overflow vessel receiving an overflow effluent from the hydrocyclone;
an enclosed underflow vessel receiving an underflow effluent from the hydrocyclone, said enclosed overflow and underflow vessels being separate and without fluid communication therebetween;
an overflow gas blanket over the overflow effluent in said enclosed overflow vessel; and a control system programmed to maintain a predetermined pressure differential ratio for the hydrocyclone by adjusting a pressure level of said overflow gas blanket.

2. The separation unit of claim 1, wherein said pressure control system includes an overflow pressure sensor relaying overflow-vessel pressure information to a processor, a source of pressurized gas connected to the overflow vessel, and a valve actuated by a control module to vary a pressure in the overflow vessel as necessary to maintain said predetermined pressure differential ratio for the hydrocyclone.

3. The separation unit of claim 1, further including an underflow gas blanket over the underflow effluent in said enclosed underflow vessel; and wherein said pressure control system is programmed to maintain a predetermined pressure differential ratio for the hydrocyclone by adjusting pressure levels of said overflow and underflow gas blankets.

4. The separation unit of claim 3, wherein said pressure control system includes an overflow pressure sensor relaying overflow-vessel pressure information to a processor; an underflow pressure sensor relaying underflow-vessel pressure information to the processor; a source of pressurized gas connected to the overflow vessel; another source of pressurized gas connected to the underflow vessel; and an overflow valve actuated by a control module to vary a pressure in the overflow vessel and an underflow valve actuated by the control module to vary a pressure in the underflow vessel as necessary to maintain said predetermined pressure differential ratio for the hydrocyclone.

5. The separation unit of claim 4, wherein said processor and control module are incorporated in a single processing unit.

6. The separation unit of claim 4, wherein said source and another source of pressurized gas are a single shared source of gas.

7. The separation unit of claim 4, further including a feed pressure sensor relaying feed pressure information to the processor, and wherein the control module is operatively connected to a feed valve to vary a pressure in a feed input to the hydrocyclone.

8. The separation unit of claim 1, wherein said hydrocyclone is processing a tar sand slurry.

9. In a hydrocyclone in a liquid/solid separation circuit wherein an input slurry is separated into a liquid and a solid discharged from the hydrocyclone as overflow and underflow effluents, respectively, the improvement comprising:
an overflow vessel receiving the overflow effluent under substantially hermetic conditions;
an underflow vessel receiving the underflow effluent under substantially hermetic conditions, said overflow and underflow vessels being separate and without fluid communication therebetween;
a source of pressurized gas connected to said overflow vessel to form an overflow gas blanket over the overflow effluent;
another source of pressurized gas connected to said underflow vessel to form an underflow gas blanket over the underflow effluent; and
a controller adapted to maintain a predetermined pressure differential ratio for the hydrocyclone by affecting pressure levels of said underflow and overflow gas blankets.

10. The hydrocyclone of claim 9, wherein said source and another source of pressurized gas are a single shared source of gas.

11. The hydrocyclone of claim 9, wherein said controller includes an overflow pressure sensor relaying overflow-vessel pressure information to a processor; an underflow pressure sensor relaying underflow-vessel pressure information to the processor; and an overflow valve actuated by a control module to vary a pressure in the overflow vessel and an underflow valve actuated by the control module to vary a pressure in the underflow vessel as necessary to maintain said predetermined pressure differential ratio for the hydrocyclone.

12. The hydrocyclone of claim 11, wherein said processor and control module are incorporated in a single processing unit.

13. The hydrocyclone of claim 11, wherein said source and another source of pressurized gas are a single shared source of gas.

14. The hydrocyclone of claim 11, further including a feed pressure sensor relaying feed pressure information to the processor, and wherein the control module is operatively connected to a feed valve to vary a pressure in a feed input to the hydrocyclone.

15. The hydrocyclone of claim 9, wherein said input slurry is a tar sand slurry.

16. A method for maintaining a pressure differential ratio at a predetermined level in hydrocyclone operating as a liquid/solid separation unit, the method comprising the following steps:
connecting the hydrocyclone to an enclosed overflow vessel receiving an overflow effluent from the hydrocyclone;
connecting the hydrocyclone to an enclosed underflow vessel receiving an underflow effluent from the hydrocyclone, said enclosed overflow and underflow vessels being separate and without fluid communication therebetween;
providing an overflow gas blanket over the overflow effluent in said enclosed overflow vessel;
providing an underflow gas blanket over the underflow effluent in said enclosed underflow vessel; and
controlling pressure levels of said underflow and overflow gas blankets so as to maintain said predetermined pressure differential ratio.

17. The method of claim 16, wherein said overflow and underflow gas blankets are provided from a single shared source of pressurized gas.

18. The method of claim 16, wherein said controlling step is carried out with an overflow pressure sensor relaying overflow-vessel pressure information to a processor; an underflow pressure sensor relaying underflow-vessel pressure information to the processor; and an overflow valve actuated by a control module to vary a pressure in the overflow vessel and an underflow valve actuated by the control module to vary a pressure in the underflow vessel as necessary to maintain said predetermined pressure differential ratio for the hydrocyclone.

19. The method of claim 18, wherein said processor and control module are incorporated in a single processing unit.

20. The method of claim 18, wherein said controlling step further includes measuring and relaying feed pressure information to the processor, and operating a feed valve to vary a pressure in a feed input to the hydrocyclone.

* * * * *